US009408172B2

(12) United States Patent
Gupta

(10) Patent No.: US 9,408,172 B2
(45) Date of Patent: Aug. 2, 2016

(54) HIGH PRECISION NETWORK SYNCHRONIZATION IN AN INDOOR POSITION LOCATION SYSTEM

(71) Applicant: QUALCOMM Incorporated, San Diego, CA (US)

(72) Inventor: Alok Kumar Gupta, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/042,449

(22) Filed: Sep. 30, 2013

(65) Prior Publication Data

US 2015/0092754 A1 Apr. 2, 2015

(51) Int. Cl.
*H04W 56/00* (2009.01)
*H04W 4/04* (2009.01)
*H04B 7/26* (2006.01)

(52) U.S. Cl.
CPC ......... *H04W 56/0015* (2013.01); *H04B 7/2687* (2013.01); *H04W 4/04* (2013.01); *H04W 56/001* (2013.01); *H04W 56/0035* (2013.01)

(58) Field of Classification Search
CPC ...... H04W 12/06; H04W 84/12; H04W 88/08
See application file for complete search history.

(56) References Cited

U.S. PATENT DOCUMENTS

| 6,795,421 | B1 * | 9/2004 | Heinonen et al. ............. 370/338 |
| 7,653,166 | B2 | 1/2010 | Wagner et al. |
| 8,189,494 | B2 | 5/2012 | Budampati et al. |
| 8,379,736 | B2 * | 2/2013 | Santhoff ............... G01S 13/765 375/259 |
| 2012/0287921 | A1 | 11/2012 | Chowdhary et al. |

FOREIGN PATENT DOCUMENTS

| WO | WO-0051366 A2 | 8/2000 |
| WO | WO-0143317 A2 | 6/2001 |
| WO | WO-2012158578 A1 | 11/2012 |

OTHER PUBLICATIONS

ISO/EPO, International Search Report and Written Opinion of the International Searching Authority, Int'l App. No. PCT/US2014/056902, Nov. 24, 2014, European Patent Office, Rijswijk, NL, 11 pgs.
Ashraf CH., et al., Efficient Time Synchronization in Wireless Sensor Networks, World Academy of Science, Engineering and Technology, Aug. 2010, pp. 1517-1520, Issue 44.
Baek, Receiver Synchronization for UWB TDOA Localization, a Thesis Submitted to Oregon State University, Aug. 20, 2010, Oregon State University Libraries, 74 pgs.
IPEA/EPO, Second Written Opinion of the International Preliminary Examining Authority, Int'l App. No. PCT/US2014/056902, Sep. 17, 2015, European Patent Office, Rijswijk, NL, 7 pgs.

* cited by examiner

*Primary Examiner* — Chandrahas Patel
(74) *Attorney, Agent, or Firm* — Holland & Hart LLP

(57) ABSTRACT

Methods, systems, and devices for synchronizing a position location network. The methods, systems, and/or devices may provide for designating as a master AP one AP from a network. The master AP may broadcast synchronization signals, which other APs in the network may use to synchronize their respective oscillators and/or clocks. In some cases, the master AP and/or a network server (e.g., a tracking management server) may designate acting master APs. The acting master APs may, for example, broadcast synchronization signals to neighboring APs. The acting master APs and/or the master AP may maintain lists of synchronized APs, which may be transmitted among APs and/or to a network server.

38 Claims, 12 Drawing Sheets

HIGH PRECISION NETWORK SYNCHRONIZATION IN AN INDOOR POSITION LOCATION SYSTEM

BACKGROUND

In some settings, such as in indoor and enterprise environments, it may be important to easily locate various types of assets or people, or both. Examples of such settings include hospitals, retail stores, warehouses, etc. The accuracy and speed with which the location of assets or people is monitored in an indoor setting may be an important factor in determining the usefulness of the tracking system. In addition, having a location system that is cost effective, scalable, and that can provide continuous, accurate, and precise location monitoring is also desirable.

Different systems and devices may be used to locate assets and/or people in a particular indoor environment. An ultra-wideband (UWB) network, or some other radio frequency network deployed throughout at least a portion of the indoor environment, may be configured to perform indoor tracking. Systems may employ multiple access points (APs) placed at specific locations in the indoor environment. A location tracking tag also may be attached to each mobile asset and/or to each person to be tracked. The tag may send waveforms (e.g., beacon signals) that are received by the APs for ranging measurements to determine the distance between the tag and the APs that receive the waveforms. Once the distances between the tag and at least three different APs are obtained, triangulation or trilateration may be used to estimate the location of the asset or person to which the tag is attached.

A position location network may be calibrated to provide accurate location measurements. Calibration may include synchronizing each AP to a master AP within the network. It is desirable to obtain the highest precision synchronization possible, which may require network wide synchronization, not just local synchronization.

SUMMARY

Described below are methods, systems, and/or devices that provide for high precision network wide synchronization in a position location network. The methods, systems, and/or devices may include tools and techniques that provide for incrementally synchronizing timers and oscillators located at respective APs to the timers and oscillator of a master AP within a tracking area of a position location network. The synchronization may include a coarse frequency and timing acquisition and a fine frequency and timing acquisition. These techniques may be utilized over a multi-hop wireless network.

A first, or master, AP with one or more oscillators and timers may be used to synchronize neighboring APs. For example, the master AP may broadcast a synchronization signal, which may include information related to the oscillator frequency and/or timer time (as referred to as timer count). APs within the vicinity may receive the synchronization signal and make estimates and/or corrections to their oscillators and/or timers. Once the other APs synchronize to the master AP, they may send an acknowledgment message. In some cases, APs that have synchronized to the master AP and sent an acknowledgment message may be designated as acting master APs. Acting master APs may operate similarly to master APs and may broadcast a synchronization message to neighboring APs, so that the neighboring APs may synchronize to the system. The master AP and/or a tracking management server may keep, or update, a list of APs within the network that have been synchronized to the system time broadcast from the master AP.

A method of synchronizing a position location network is described. A master access point (AP) may be selected from among a plurality of APs. Each of the APs may have a reference oscillator and a timer. A first synchronization message may be broadcast from the master AP. A first acknowledgment message may be received at the master AP from each AP that synchronized to the master AP based on the first synchronization message. One or more APs from which an acknowledgment message is received may be designated as an acting master AP.

In one embodiment, each AP may be configured with a narrowband transceiver and an ultra-wideband (UWB) transceiver. Broadcasting the first synchronization message may include broadcasting a narrowband signal. The first synchronization message may include information related to an oscillator frequency and a timer count. An AP that synchronized to the master AP may be an AP that estimated a frequency offset and a time offset with respect to the master AP. Broadcasting the first synchronization message may include broadcasting an ultra-wideband (UWB) signal.

In one configuration, an AP that synchronized to the master AP may include an AP that adjusted an oscillator frequency and a timer count based on the first synchronization message. A second synchronization message may be broadcast from a designated acting master AP. A second acknowledgment message may be received at the designated acting master AP from each AP that synchronized to the designated acting master AP based on the second synchronization message. Broadcasting the second synchronization message may include broadcasting at least one of a narrowband signal or a UWB signal. The second synchronization message may include information related to an oscillator frequency and a timer count.

In one configuration, one or more lists of neighboring APs synchronized to the one or more designated acting master APs may be received from the one or more designated acting master APs. Receiving the one or more lists may include receiving, from the one or more designated acting master APs at the master AP, one or more lists of neighboring APs synchronized to the one or more designated acting master APs. Receiving the one or more lists may further include receiving, from the master AP at a tracking management server, one or more lists of neighboring APs synchronized to at least one of the master AP and the one or more designated acting master APs.

A system of synchronizing a position location network is also described. The system may include means for selecting a master access point (AP) from among a plurality of APs. Each of the APs having a reference oscillator and a timer. The system may further include means for broadcasting a first synchronization message from the master AP, means for receiving, at the master AP, a first acknowledgment message from each AP that synchronized to the master AP based on the first synchronization message, and means for designating as acting master APs one or more APs from which an acknowledgment message is received.

An apparatus for synchronizing a position location network is also described. The apparatus may include a processor and memory in electronic communication with the processor. Instructions may be stored in the memory. The instructions may be executable by the processor to broadcast a first synchronization message from the master AP, receive, at the master AP, a first acknowledgment message from each AP that synchronized to the master AP based on the first synchronization message, and designate as acting master APs one or more APs from which an acknowledgment message is received.

A computer-program product for synchronizing a position location network is also described. The computer-program product may include a non-transitory computer-readable medium storing instructions executable by a processor to broadcast a first synchronization message from the master AP, receive, at the master AP, a first acknowledgment message from each AP that synchronized to the master AP based on the first synchronization message, and designate as acting master APs one or more APs from which an acknowledgment message is received.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described that address issues pertaining to synchronizing APs within a network of APs in a position location network (as referred to as location tracking and/or position location systems). The methods, systems, and/or devices may include tools and techniques that provide for incrementally synchronizing timers and oscillators located at respective APs. The synchronization may include a master AP with a wired or wireless connection to a central server, or tracking management server. The master AP may have a stable oscillator and stable timer(s).

The master AP may broadcast a synchronization signal, which may include information related to oscillator frequency and/or timer time. APs within the vicinity may receive these signals and make estimates and/or corrections to their oscillators and timers. In this way, the system frequency and/or time broadcast from the master AP may be relayed to other APs. Once the other APs synchronize to the master AP, they may send an acknowledgment message.

In some cases, APs that have synchronized to the master AP and sent an acknowledgment message may assume the role of acting master AP. The master AP and/or a tracking management server may designate synchronized APs as acting master APs. Acting master APs may perform a role similar to the master AP. For example, APs in the vicinity of an acting master AP may synchronize with the acting master AP and acquire the system information, just as if it were synching with the master AP. As the number of acting master APs within the network increases, synchronization rate may also increase. That is, the number of APs exposed to synchronization broadcasts may increase as the number of acting master APs increases, creating a "synchronization wave" that propagates out from the master AP. This process may continue until each AP within the network is synchronized.

Each acting master AP may transmit to the master AP a list of synchronized APs. The master AP may keep track of each synchronized AP within the network. Additionally or alternatively, the master AP may forward the list(s) of synchronized APs to the tracking management server.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
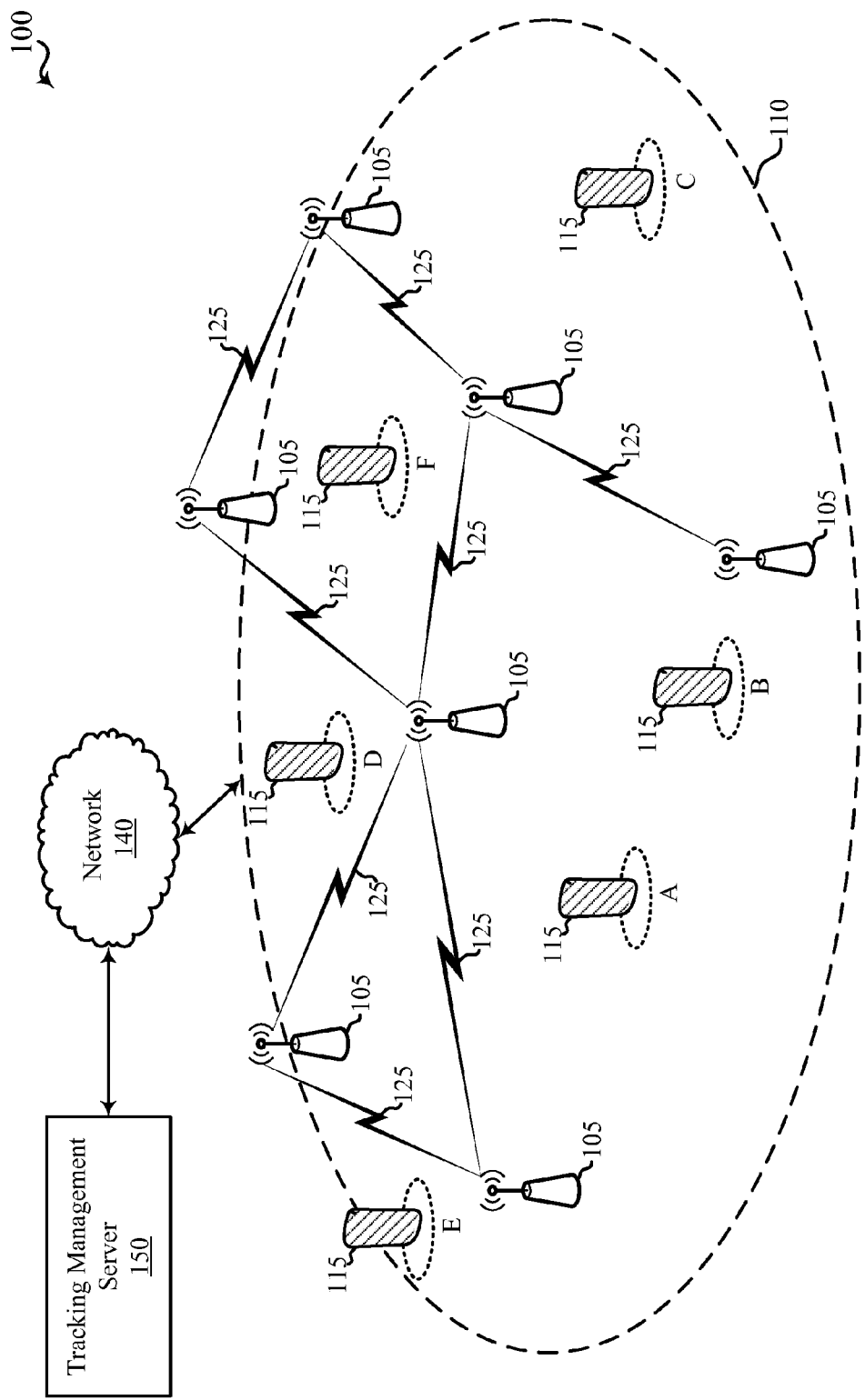
FIGS. 1A and 1B show an example(s) of a position location network in accordance with various embodiments.

First, FIG. 1A depicts an example of a position location network 100 in accordance with various embodiments. The system 100 provides location tracking of assets (e.g., objects) or people, or both, throughout the coverage area 110 associated with an indoor and/or enterprise environment. In some embodiments, the coverage area 110 represents an area of coverage inside a building, such as a hospital, a retail store, or a warehouse. Within the coverage area 110, multiple APs 105 may be deployed at specific locations, as may multiple tags 115 (as referred to as tag units and/or location tracking tags), which may be tracked within the coverage area 110. Because of their stationary nature, the exact distance between any two APs 105 is typically known, or may be determined, throughout the operation of the system 100. Any two APs 105 may ascertain the distance between themselves through a ranging operation, which may be a two-way ranging operation. The ranging operation may be performed via communication links 125.

The arrangement of APs 105 shown in FIG. 1A is intended as a non-limiting example. The APs 105 may be deployed or distributed within the coverage area 110 in a manner or pattern different from that depicted in FIG. 1A. For example, the APs 105 may be arranged at different distances form one another. In some cases, the coverage area 110 may represent a two-dimensional deployment, such as a single floor within a building. But in some embodiments, the APs 105 are deployed in a three-dimensional manner by placing some of the APs 105 on different floors or levels of a building within the coverage area 110.

Each of the APs 105 may be equipped with a narrowband transceiver or a UWB transceiver, or both. Additionally or alternatively, the APs 105 may include one or more oscillators or timers, or both. The oscillators may each produce a repetitive, oscillating electronic signal, which may be adjustable and/or variable. The oscillators may be RF oscillators. The oscillators may be linear- or relaxation-type. In some embodiments, the oscillators are voltage controlled, temperature compensated crystal oscillators (VCTCXO). The timers may include quartz clock(s), they may be digital, and/or they may be implemented in software.

The APs 105 may need to undergo a calibration procedure in order to increase the precision and/or accuracy of the tracking system 100. Calibration may include synchronizing the APs 105 to one another, to a network 140, and/or to a tracking management server 150. Additionally or alternatively, calibration may include determining coordinates of each AP 105.

In some cases, one or more APs 105 are designated or selected as master APs or acting master APs that facilitate synchronization. Network-wide synchronization of APs 105 may involve designating or selecting a master AP 105 with a stable oscillator and stable timer. Each of the other APs 105 may synchronize their respective oscillators and timers to the master AP or to an acting master AP. This synchronization may include coarse and fine synchronization steps, which, in some embodiments, involves receiving and transmitting both narrowband and UWB signals.

Calibration may also include determining the coordinates of each of the APs 105 within the coverage area 110. Coordinates of each of the APs 105 may be determined incrementally, based on known coordinates of one of the APs 105 and known or determined distances between APs 105.

Each of the tag units 115 may be attached to an asset or person being tracked within the coverage area 110. The tag units 115 may be equipped with a narrowband transceiver or a UWB transceiver, or both. The tag units 115 may also have one or more oscillators or timers, or both. The oscillators may each produce a repetitive, oscillating electronic signal, which may be adjustable and/or variable. The oscillators may be RF oscillators. The oscillators may be linear- or relaxation-type. By way of example, the oscillators are VCTCXO. The timers may include quartz clock(s), they may be digital, and/or they may be implemented in software.

FIG. 1A depicts an example position location network 100 with six tag units at locations A, B, C, D, E, and F. Over time, these locations may change as the assets or people to which the tags 115 are attached move or are moved within the coverage area 110. The system 100, shown with six tags 115, is intended as a non-limiting example of a position location network. Those skilled in the art will recognize that the system 100 is scalable, and it may be capable of tracking more or fewer0 assets or people.

The system 100 includes a tracking management server 150, which also may be referred to as a tag tracking management server. In some embodiments, the tracking management server 150 is connected to the APs 105 through a network 140. The connection may be by way of a radio network associated with the APs 105. The tracking management server 150 may receive information from the APs 105 to perform various types of calculations, including: determining one or more sets of receive filters for the APs 105; detecting whether a tag 115 is mobile or stationary and adjusting update rates accordingly; estimating characteristics of communication channels; and/or estimating a location of an asset or person being tracked within the coverage area 110. The tracking management server 150 may also schedule or coordinate various operations associated with the APs 105, including when to have an AP 105 wirelessly communicate (e.g., when to transmit UWB and/or narrowband signals) with other APs 105 or with tags 115. In some embodiments, the tracking management server 150 stores information about different APs 105 and subsets of APs 105; and it may use stored information to schedule or coordinate various operations between individual APs 105 and/or subsets of APs 105.

The APs 105 may communicate with one another by sending and/or receiving UWB signals and/or narrowband signals. The channels between APs 105, which are associated with communication links 125, are often characterized by noise and signal-degrading impedances. It may therefore be beneficial to maximize the signal transmit power.

Figure 1B:
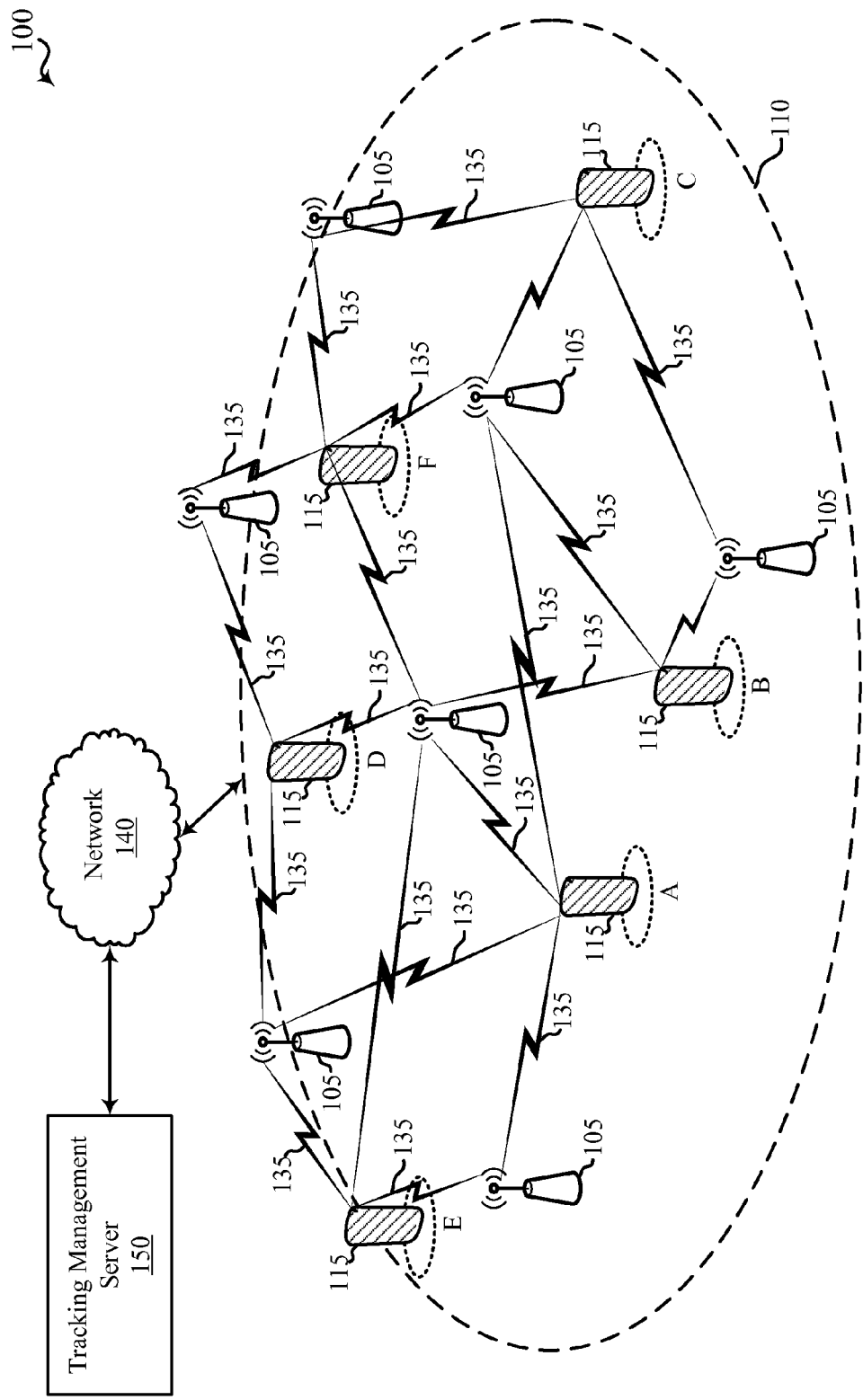

FIG. 1B illustrates transmissions or broadcasts between APs 105 and tags 115 via communication links 135. In some embodiments, the tags 115 communicate with APs 105 via the communication links 135 using either or both UWB and narrowband signals. Whether a tag 115 communicates primarily with narrowband or UWB may be a function of whether the tag 115 is mobile or stationary.

An AP 105 may communicate with other APs 105 using either or both UWB and narrowband signals. During this communication a second AP may synchronize with a first AP. Upon receipt of an acknowledgment message from the second AP, the first AP may designate the second AP as an acting master AP. Once the second AP is designated as an acting master AP, the second AP may be used by neighboring APs to synchronize their oscillator and/or timer(s). The neighboring APs may send an acknowledgment message to the second AP to communicate that they have been properly synchronized. The second AP may send a synchronization list to the first AP including a list of APs that have been synchronized. The first AP may keep track of which APs within the network have been synchronized. In some cases, the first AP may transmit the synchronization list to a tracking management server 150.

Figure 2A:
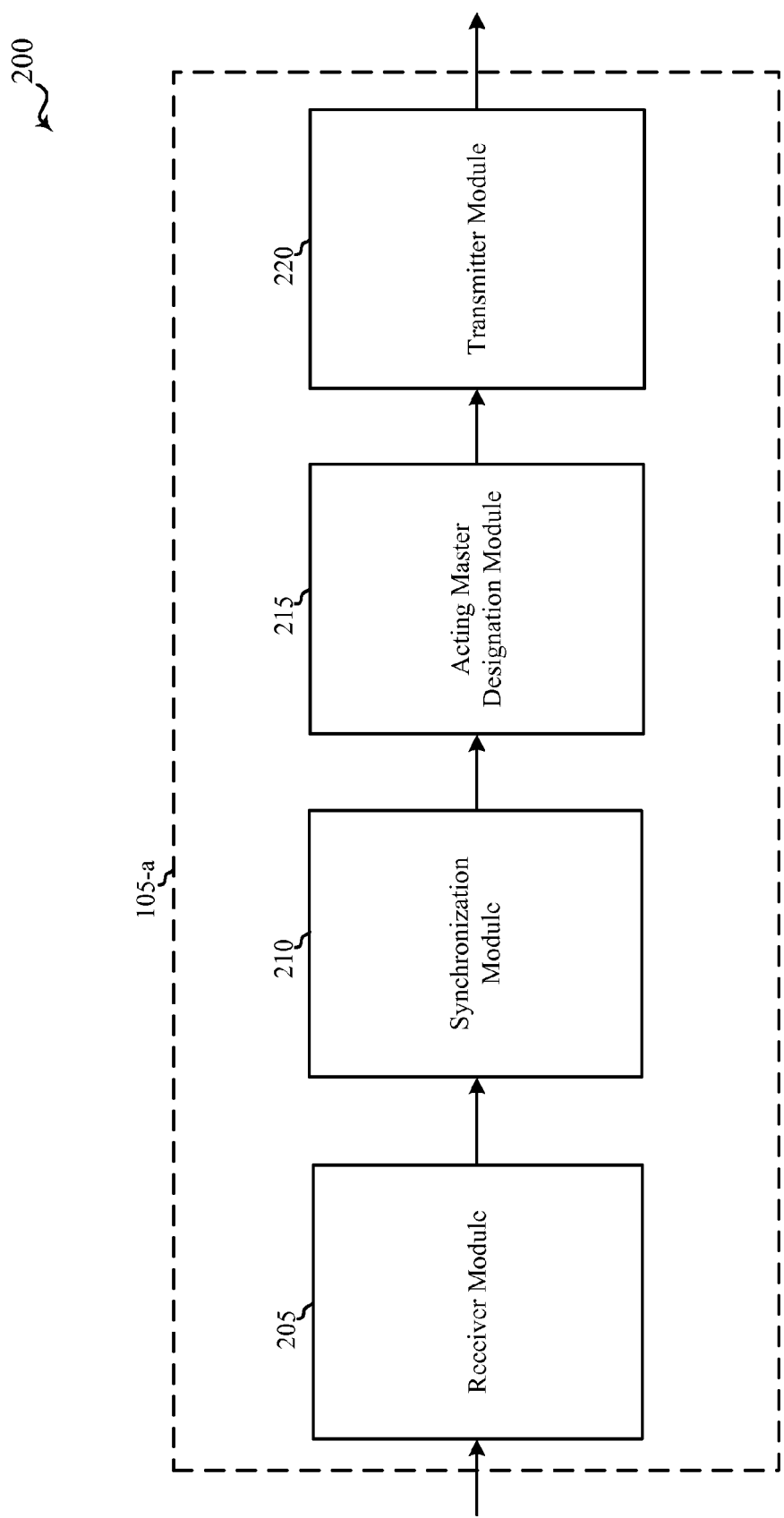
FIGS. 2A and 2B show block diagrams of an example device(s) that may be employed in position location networks in accordance with various embodiments.

Next, turning to FIG. 2A, a block diagram illustrates a device 200 configured for synchronizing APs in a position location network in accordance with various embodiments. The device 200 may be an AP 105-a, which may be an example of an AP 105 of FIG. 1A or FIG. 1B, or both. In some embodiments, the device 200 is a processor. The device 200 may include a receiver module 205, a synchronization module 210, an acting master designation module 215, and/or a transmitter module 220. In some cases, the receiver module 205 and the transmitter module 220 are a single, or multiple, transceiver module(s). The receiver module 205 and/or the transmitter module 220 may include an integrated processor. They may also include an oscillator and/or a timer. In some embodiments, the receiver module 205 and the transmitter module 220 are a part of a UWB transceiver module, a narrowband transceiver module, or both.

The device 200 may include a synchronization module 210. The synchronization module 210 may include an oscillator and/or timer(s). It may also include an integrated processor. The synchronization module 210 may prepare a synchronization message to be transmitted to another AP which includes information based on an oscillator and/or a timer(s). The synchronization module 210 may analyze a received message to determine a frequency offset and/or timer offset, or an adjustment that needs to be made in order to synchronize an oscillator and/or timer. In some cases, the synchronization module 210 may adjust or change an oscillator and/or timer(s) in order to synchronize with another AP.

The device may include an acting master designation module 215. The acting master designation module 215 may include an integrated processor. The acting master designation module 215 may include a database. In some cases, the acting master designation module 215 prepares a communication to let another AP know that it may act as a master AP. A master AP, or an acting-master AP, may have a synchronized oscillator and/or timer(s) and may be used for synchronization by neighboring APs.

In some embodiments, the components of the device 200 are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

By way of illustration, the device 200, through the receiver module 205, the synchronization module 210, the acting master designation module 215, and the transmitter module 220, may prepare a signal at the synchronization module 210 including information regarding an oscillator and/or timer(s). The transmitter module may then transmit the signal to another AP. The receiver module 205 may receive an acknowledgment message letting the device 200 know that synchronization with the other AP has been successful. The acting master designation module 215 may prepare a signal, to be transmitted by the transmitter module 220, including instructions designating the other AP as an acting master AP.

Figure 2B:
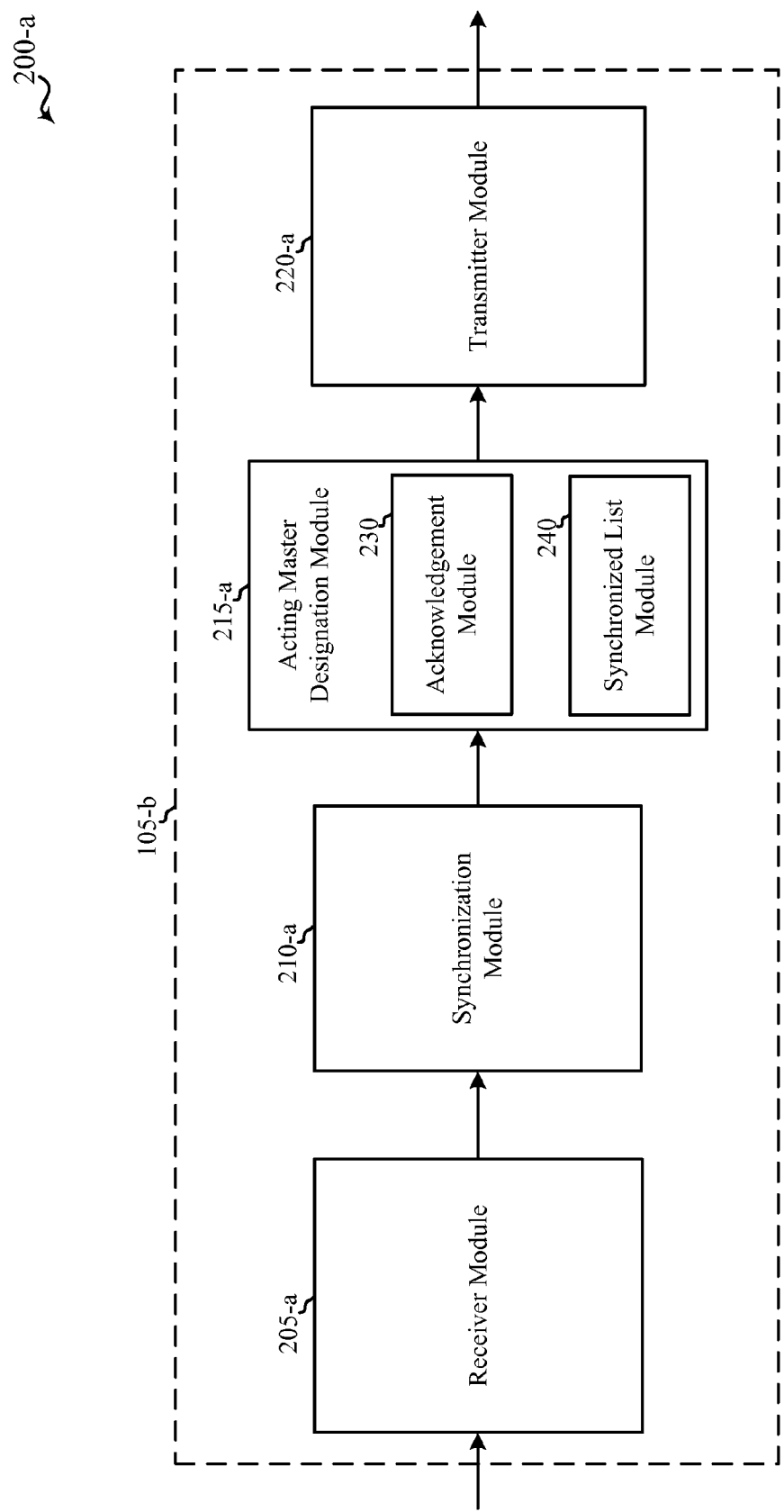

Next, FIG. 2B shows a block diagram of a device 200-*a* configured for synchronizing APs in a position location network in accordance with various embodiments. The device 200-*a* may be an example of the device 200 of FIG. 2A; and the device 200-*a* may perform the same or similar functions as described above for device 200. In some embodiments, the device 200-*a* is an AP 105-*b*, which may include one or more aspects of the APs 105 described above with reference to any or all of FIGS. 1A, 1B, and 2A. The device 200-*a* may also be a processor. In some cases, the device 200-*a* includes a receiver module 205-*a*, which may be an example of the receiver module 205 of FIG. 2A; and the receiver module 205-*a* may perform the same or similar functions as described above for receiver module 205. In some cases, the device 200-*a* includes a transmitter module 220-*a*, which may be an example of the transmitter module 220 of FIG. 2A; and the transmitter module 220-*a* may perform the same or similar functions as described above for transmitter module 220.

In some embodiments, the device 200-*a* includes a synchronization module 210-*a*, which may be an example of the synchronization module 210 of FIG. 2A. The synchronization module 210-*a* may estimate an offset, such as a frequency offset and/or a time offset. Further, the synchronization module 210-*a* may adjust an estimated offset. In some cases, the synchronization module 210-*a* corrects a frequency of an oscillator and/or a time (or count) of a timer. In some cases, the synchronization module 210-*a* reports a frequency and/or time so other devices may synchronize with the device 200-*a*

In some embodiments, the device 200-*a* includes an acting master designation module 215-*a*, which may be an example of the acting master designation module 210 of FIG. 2A. The acting master designation module 210-*a* may prepare a communication to let another AP know that it may act as a master AP. A master AP, or an acting master AP, may have a synchronized oscillator and/or timer(s) and may be used for synchronization by neighboring APs. Further, the acting master designation module 210-*a* may prepare a communication including an acknowledgment message informing another device that the device 200-*a* has been successfully and/or unsuccessfully synchronized.

In some cases, the device 200-*a* includes an acknowledgment module 230. The acknowledgment module 230 may prepare communications including synchronization information, such as an indication that synchronization was successful. Further the acknowledgment module 230 may analyze communications from other devices to determine a device to designate as an acting master.

In some cases, the device 200-*a* includes a synchronized list module 240. The synchronized list module 240 may include an integrated processor. In an embodiment the synchronized list module 240 includes a database. The synchronized list module 240 may keep a list of devices, such as APs, that have been successfully synchronized. In some cases, the synchronized list module 240 keeps a list of devices that have not been successfully synchronized. The synchronized list module 240 may collect synchronization information to be transmitted to a tracking management server.

According to some embodiments, the components of the device 200-*a* are, individually or collectively, implemented with one or more ASICs adapted to perform some or all of the applicable functions in hardware. In other embodiments, the functions of device 200-*a* are performed by one or more processing units (or cores), on one or more integrated circuits. In other embodiments, other types of integrated circuits are used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 3:
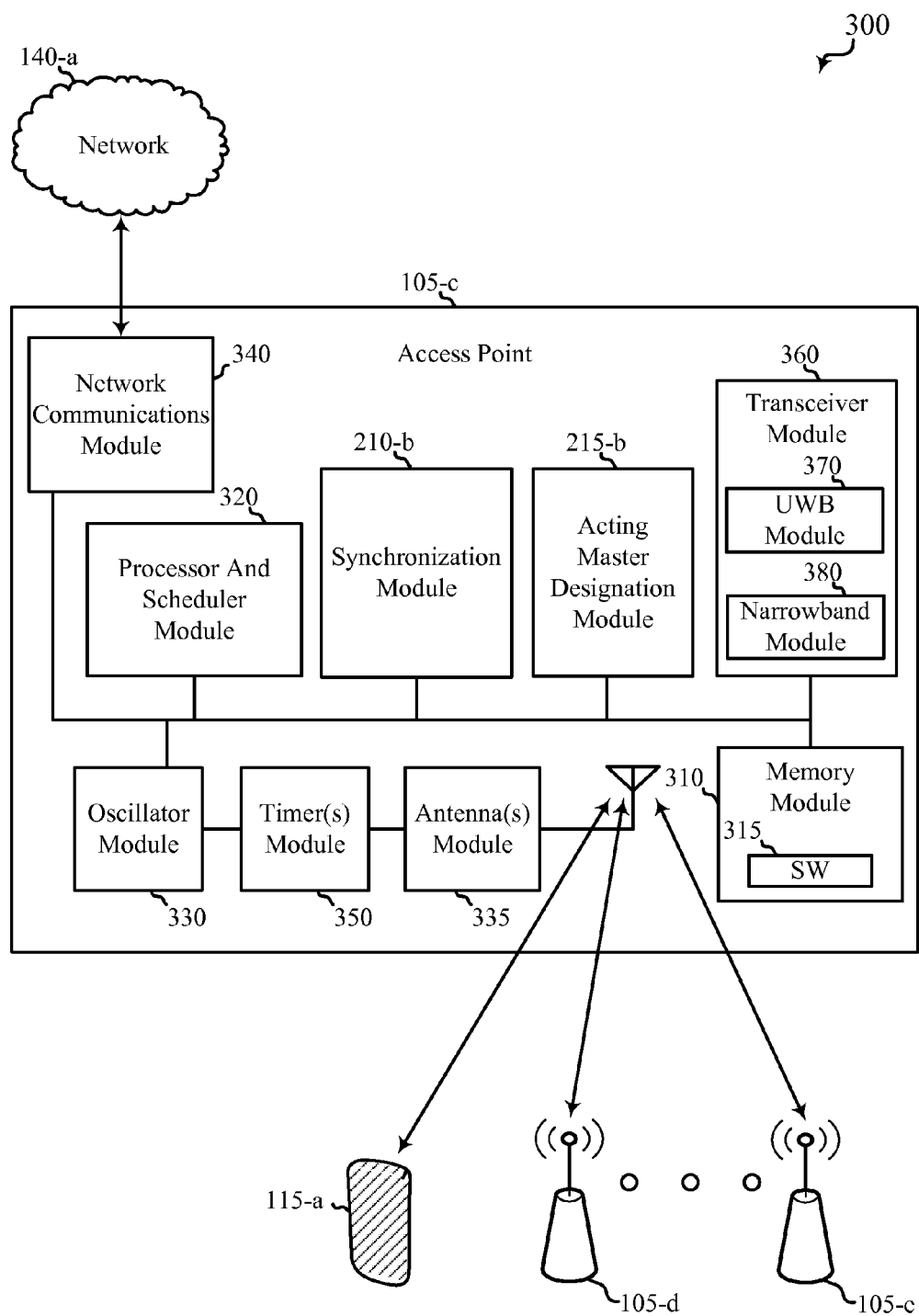
FIG. 3 shows a block diagram of an example of a position location network in accordance with various embodiments.

Turning now to FIG. 3, which depicts a block diagram of a system 300 configured for synchronizing APs in a position location network in accordance with various embodiments. The system 300 may include a APs 105-*c*, 105-*d*, and 105-*e*, which may be examples of the APs 105 described with reference to one or more of FIGS. 1A, 1B, 2A, and 2B. The AP 105-*c* may include a memory module 310, which, in some embodiments, includes a software module 315. The AP 105-*c* may include a processor and scheduler module 320, an oscillator module 330, antenna(s) module 335, a network communications module 340, timer(s) module 350, a transceiver module 360, a synchronization module 210-*b*, and/or an acting master designation module 215-*b*. In some cases, the timer(s) module 350 and/or the oscillator module 330 operate based on a 32 MHz reference timer and/or oscillator. In some embodiments, the AP 105-*c* and/or the transceiver module 360 also includes an UWB module 370 and/or a narrowband module 380. Each of the components of the AP 105-*c* may be in communication with each other. The network communications module 340 may be in communication with the network 140-*a*, which may be an example of the network 140 of FIGS. 1A and 1B.

The memory module 310 may include random access memory (RAM) and read-only memory (ROM). In some embodiments, the memory module 310 also stores computer-readable, computer executable software (SW) code 315 containing instructions configured to, when executed, cause the processor and scheduler module 320 to perform various functions described herein related to synchronizing APs in a position location network. In other embodiments, the software (SW) code 315 may not be directly executable by the processor and scheduler module 320; but it may be configured to cause a computer, e.g., when compiled and executed, to perform the functions described herein.

The processor and scheduler module 320 may include an intelligent hardware device, such as a central processing unit (CPU). The processor and scheduler module 320 may perform various operations associated with synchronizing APs in a position location network. The processor and scheduler module 320 may use scheduling information received from, for example, the tracking management server 150, by way of the network 140-a, to determine when it is desirable to synchronize APs 105. The processor and scheduler module 320 may perform various operations associated with synchronizing APs in a position location network, including determining when to update a synchronization of APs 105, and/or when to update a synchronization list of APs 105.

The transceiver module 360 may include an ultra wideband (UWB) transceiver 370 and/or a narrowband transceiver 380. Either or both of the UWB transceiver 370 and narrowband transceiver 380 may include a modem configured to modulate data (e.g., packets) and provide the modulated data to the antenna(s) module 335 for transmission, and to demodulate data received from the antenna(s) module 335. Some embodiments of the AP 105-c include a single antenna; other embodiments include multiple antennas. As shown in FIG. 3, signals transmitted from a tag 115-a may be transmitted to and/or received by the AP 105-c via the antenna(s) in or connected to the antenna(s) module 335. The AP 105-c may also wirelessly communicate with other APs, such as APs 105-d through 105-e. In some embodiments, the AP 105-c may receive signals, including UWB, narrowband, and reference signals from other APs 105; and the AP 105-c may use the received signals for calibrating and/or synchronizing components of the AP 105-c; and/or the AP 105-c may use the received signals for determining a location (e.g., a position) of a tag unit 115. In some cases, the AP 105-c may transmit received signals to the tracking management server 150 via the network communications module 340 and the network 140-a.

The oscillator module 330 may be connected to the UWB transceiver 370. The UWB transceiver 370 may include an UWB modulator and a radio frequency (RF) transceiver. In some embodiments, the UWB transceiver 370 includes, or is in communication with, a timer, such as the timer(s) module 350. The UWB transceiver 370 may include an integrated processor. The UWB transceiver may work with, or for, the synchronization module 210-b to synchronize, for example, APs 105.

The transceiver module 360 may further include the narrowband transceiver 380. The narrowband transceiver 380 may include an integrated processor. It may also include a timer and/or oscillator. In some cases, it is in communication with the oscillator module 330 and/or the timer(s) module 350. The narrowband transceiver 380 may be capable of communicating with wireless local area network (WLAN) products that are based on the IEEE 802.11 family of standards (WiFi). In some embodiments, the narrowband transceiver is a two-way digital radio based on the IEEE 802.15 family of standards (ZigBee). In another embodiment, the narrowband transceiver is a two-way digital radio based on the IEEE 802.15.1 family of standards (Bluetooth).

Figure 4:
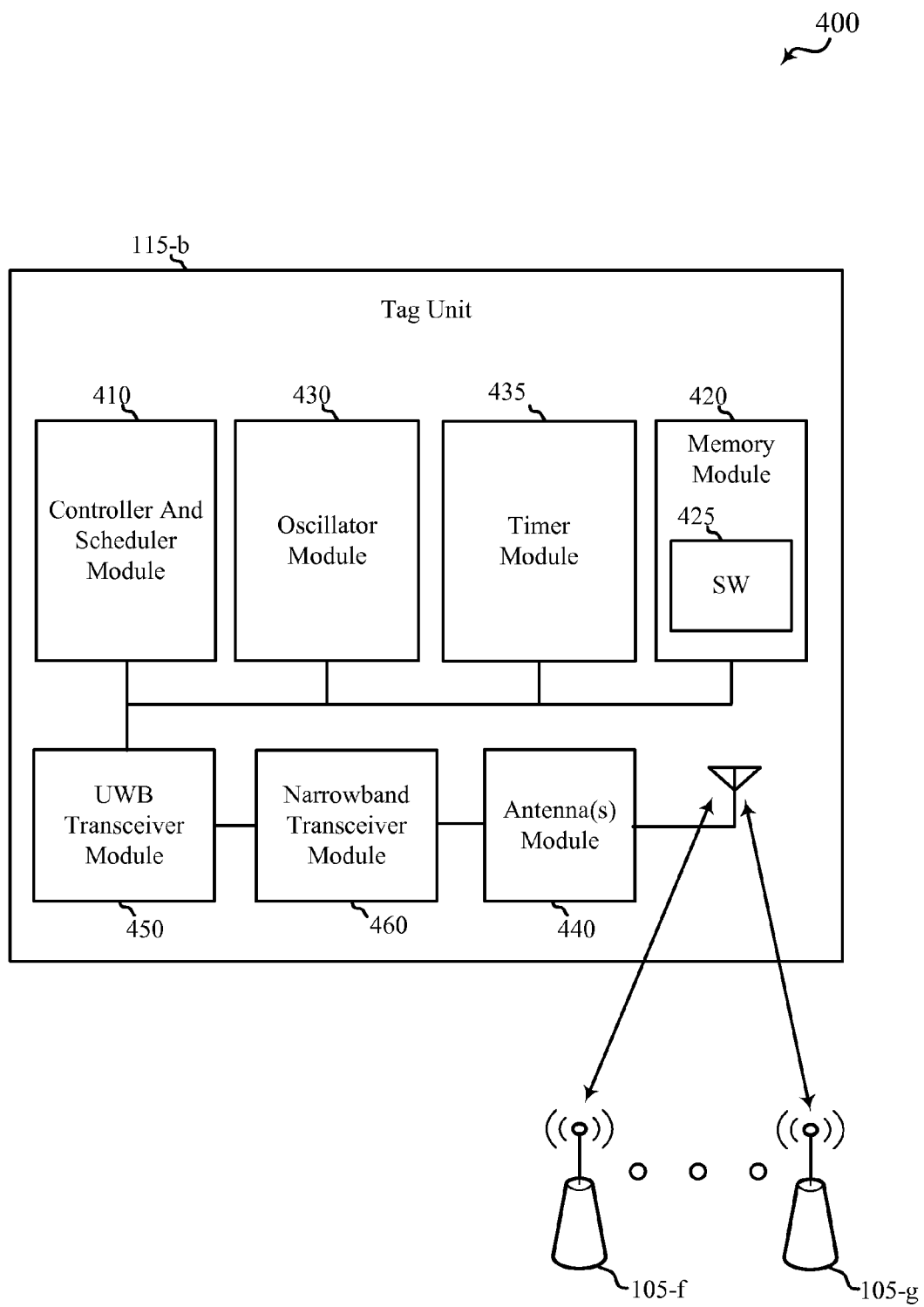
FIG. 4 shows a block diagram of an example of a position location network in accordance with various embodiments.

Next, FIG. 4 shows a block diagram illustrating a system 400 configured for synchronizing APs in a position location network, which may include a tag unit 115-b. In some embodiments, the tag unit 115-b includes one or more aspects of the tag units 115 of any or all of FIGS. 1A, 1B, 2A, 2B, and 3. The tag unit 115-b may include a controller and scheduler module 410, a memory module 420, a UWB transceiver module 450, a narrowband transceiver module 460, and antenna(s) module 440. In some embodiments, the tag unit 115 includes an oscillator module 430 or a timer module 435, or both. The oscillator module 450 and the timer module 435 may each include several oscillators and timers, respectively.

By way of illustration, the controller and scheduler module 410 includes logic or code, or both, that enables it to control the operations of the tag unit 115-b. In some cases, the controller and scheduler module 410 includes a microcontroller or a state machine to control the UWB transceiver module 450 and the narrowband transceiver module 460.

The memory module 420 may include random access memory (RAM) or read-only memory (ROM), or both. In some embodiments, the memory module 420 stores computer-readable, computer-executable software (SW) code 425 containing instructions that are configurable to, when executed, cause the controller and scheduler module 410 to perform various functions described herein for controlling the tag unit 115-b. In other embodiments, the software code 425 is not directly executable by the controller and scheduler module 410, but it may be configured to cause a computer, for example, when compiled and executed, to perform functions described herein.

The UWB transceiver module 450 may support radio frequency (RF) communication technology to broadcast UWB signals through the antenna(s) module 440. Likewise, the narrowband transceiver module 460 may support RF communication technology to broadcast narrowband signals through the antenna(s) module 440. In some embodiments, the UWB transceiver module 450 or the narrowband transceiver module 460, or both, include a modulator (not shown) to modulate location tracking information and provide the modulated information to the antenna(s) module 440 for transmission of signals. FIG. 4 shows broadcast and reception of signals between the tag unit 115-b and several APs 105. In the system 400, at least two APs 105-f and 105-g are shown communicating with the tag unit 115-b; but the tag unit 115-b may communicate with more or fewer APs 105.

Figure 5:
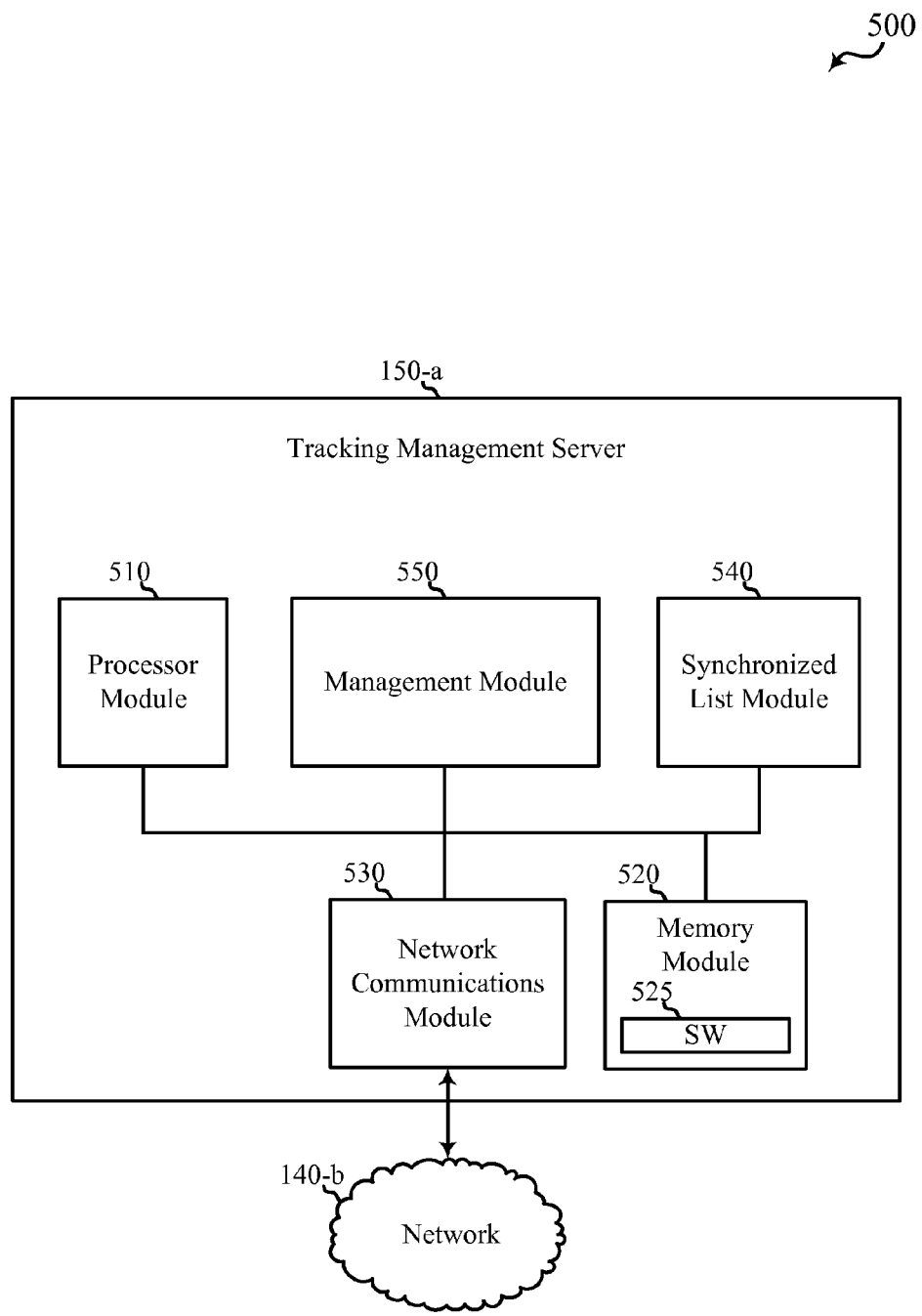
FIG. 5 shows a block diagram of an example of a position location network in accordance with various embodiments.

Referring next to FIG. 5, a system 500 is illustrated with a block diagram. The system 500 may be configured for synchronizing APs in a position location network in accordance with various embodiments. In some embodiments, the system 500 includes a tracking management server 150-a, which may be the tracking management server 150 of FIGS. 1A and/or 1B. The tacking management server 150-a may include a processor module 510, a memory module 520, a network communications module 530, a synchronized list module 540, and/or a management module 550. The management module 550 may be configured to perform calibration, synchronization, coordinate determination, filter determination, channel estimation, and/or tag update mode adjustments. In some embodiments, the management module 550 determines or selects a master AP.

The processor module 510 may also perform various operations and may include an intelligent hardware device, e.g., a CPU. In some embodiments, the processor module 510 performs various operations associated with synchronizing APs in a position location network. For example, the processor module 510 may determine what APs need to be synchronized. The tracking management server 150-a also may communicate with a network 140-b through the network communications module 530 to receive information from the APs 105 and/or to send information to the APs 105. The network 140-b may be an example of the networks 140 of any or all of FIGS. 1A, 1B, and 3.

The memory module 520 may include RAM and/or ROM. In some embodiments, the memory module 520 stores computer-readable, computer-executable software code 525 containing instructions that are configured to, when executed, cause the processor module 510 to perform various functions described herein. In other embodiments, the software code 525 may not be directly executable by the processor module 510; but the software code module may be configured to cause a computer, e.g., when compiled and executed, to perform functions described herein. The memory module 520 may include a database to store a list of synchronized APs 105, and/or determined coordinate sets comprising coordinates of various APs 105 and/or tag units 115.

The synchronized list module 540, may perform various operations and may include an intelligent hardware device, e.g., a CPU. The synchronized list module 540 may include a database. The synchronized list module 540 may store a list of synchronized APs 105. In some cases, the synchronized list module 540 may update a stored list of synchronized APs 105.

Figure 6:
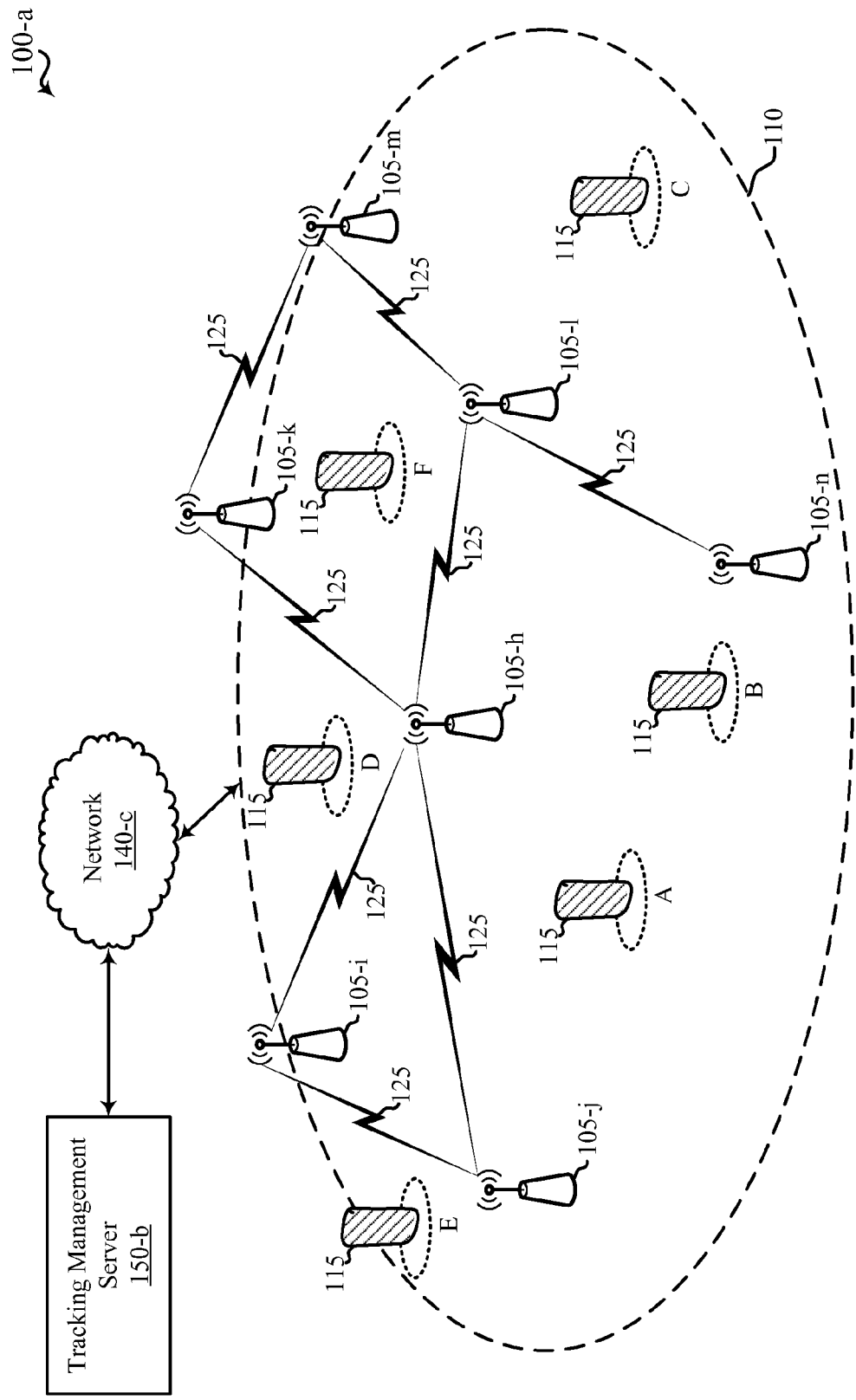
FIG. 6 shows an example of a position location network in accordance with various embodiments.

FIG. 6 shows an example of a position location network 100-$a$ in accordance with various embodiments. The system 100-$a$ may be an example of a system 100 of FIG. 1A or FIG. 1B, or both. The system 100-$a$ may use the communications 125 between APs 105 to synchronize the network within the coverage area 110. A master AP 105-$h$ may use communications 125 to determine which APs need to be synchronized, such as APs 105-$j$, 105-$i$, 105-$l$, and 105-$k$. The APs may exchange messages 125 including oscillator and/or timer information. In some cases, a second AP 105-$l$ transmits an acknowledgment message to the master AP 105-$h$ confirming that synchronization was successful. Upon receipt of the acknowledgment message, the master AP 105-$h$ may designate the second AP 105-$l$ as an acting master AP.

In an embodiment, the acting master AP 105-$l$ contains an oscillator and/or timer(s) that are synchronized with the master AP 105-$h$. The acting master AP 105-$l$ may then be used to synchronize neighboring APs 105-$m$ and 105-$n$. In some cases, the acting master AP 105-$l$ transmits information relating to the APs 105-$n$ and 105-$m$ that have been synchronized with the acting master AP 105-$l$, to the master AP 105-$h$. In an embodiment, a neighboring AP 105-$m$ may receive synchronizing information from more than one acting master APs 105-$k$ and 105-$l$. The neighboring AP 105-$m$ may decide with which acting master AP—e.g., AP 105-$k$ or 105-$l$—to synchronize. For example, the neighboring AP 105-$m$ may decide which acting master AP 105-$k$ or 105-$l$ to synchronize with based on the acting master AP from which it received the synchronization information from first and/or the acting master AP from which the received synchronization information has the strongest signal strength.

Figure 7:
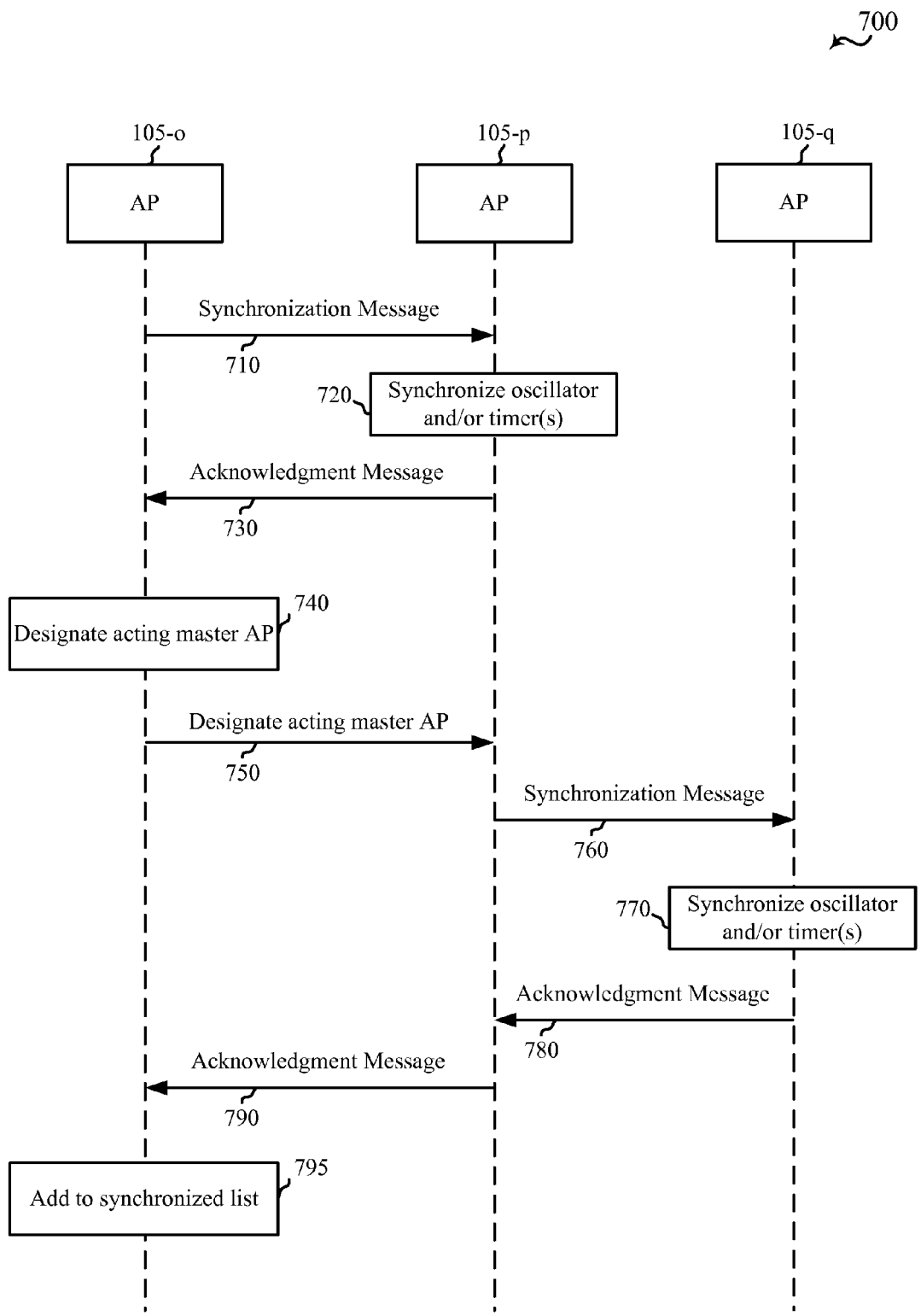
FIG. 7 shows a call flow diagram that illustrates an example of access point synchronization within a position location network in accordance with various embodiments.

Next, FIG. 7 shows a call flow diagram, which illustrates a system 700 configured for synchronizing APs in a position location network within a position location network, according to some embodiments. FIG. 7 shows synchronization between three APs 105. In the system 700, three APs 105-$o$, 105-$p$, and 105-$q$ are shown synchronizing, but synchronization may occur with more APs 105 as well. In some cases, a first, or master, AP 105-$o$ is used to synchronize secondary APs, such as a second AP 105-$p$. A first synchronization communication 710 between the master AP 105-$o$ and the second AP 105-$p$ provides the second AP 105-$p$ with information necessary to synchronize an oscillator and/or timer(s). The second AP 105-$p$ may use the information to synchronize an oscillator and/or timer(s) 720. In some cases, the second AP 105-$p$ transmits an acknowledgment message 730 to the master AP 105-$o$, to inform the master AP 105-$o$ that synchronization was successful.

In some cases, the master AP 105-$o$ adds the second AP 105-$p$ to, or updates an existing value of, a stored synchronized list. The master AP 105-$o$ may designate 740 the second AP 105-$p$ as an acting master AP, and AP 105-$p$ may assist in synchronizing APs that neighbor the second AP 105-$p$, such as a third AP 105-$q$. The master AP 105-$o$ may send a message 750 designating the second AP 105-$p$ as an acting master AP. An acting master AP may be an AP with an oscillator and/or timer(s) that is synchronized with the master AP.

In some cases, the acting master AP 105-$p$ broadcasts a synchronization message 760 which provides the third AP 105-$q$ with information necessary to synchronize an oscillator and/or timer(s). The third AP 105-$q$ may use the information to synchronize an oscillator and/or timer(s) 770. In some cases, the third AP 105-$q$ transmits an acknowledgment message 780 to the acting master AP 105-$p$, to inform the acting master AP 105-$p$ that synchronization with the third AP 105-$q$ was successful. The acting master AP 105-$p$ may then send an acknowledgment message 790 to the master AP 105-$o$ informing the master AP 105-$p$ that synchronization with the third AP 105-$q$ was successful.

In an embodiment, the third AP 105-$q$ sends an acknowledgment message directly to the master AP 105-$o$. In some cases, the master AP 105-$o$ adds the third AP 105-$q$ to, or updates an existing value of, a stored synchronized list. In some cases, the acting master AP 105-$p$ may designate the third AP 105-$q$ as another acting master AP. In an embodiment, the acknowledgment messages 730, 780, and 790 are transmitted to a tracking management server. In some cases, the synchronized list is stored and/or managed by the tracking management server. In still further embodiments, an acting master AP transmits a list (or an acknowledgment message representative of a list) of all APs 105 which have synchronized to that acting master AP. For example, the acting master AP 105-$p$ may transmit a list of all APs 105, which may include AP 105-$q$, that have synchronized to AP 105-$p$.

Those skilled in the art will recognize that the system 700 is but one implementation of the tools and techniques discussed herein. The operations of the system 700 may be rearranged or otherwise modified such that other implementations are possible.

Figure 8:
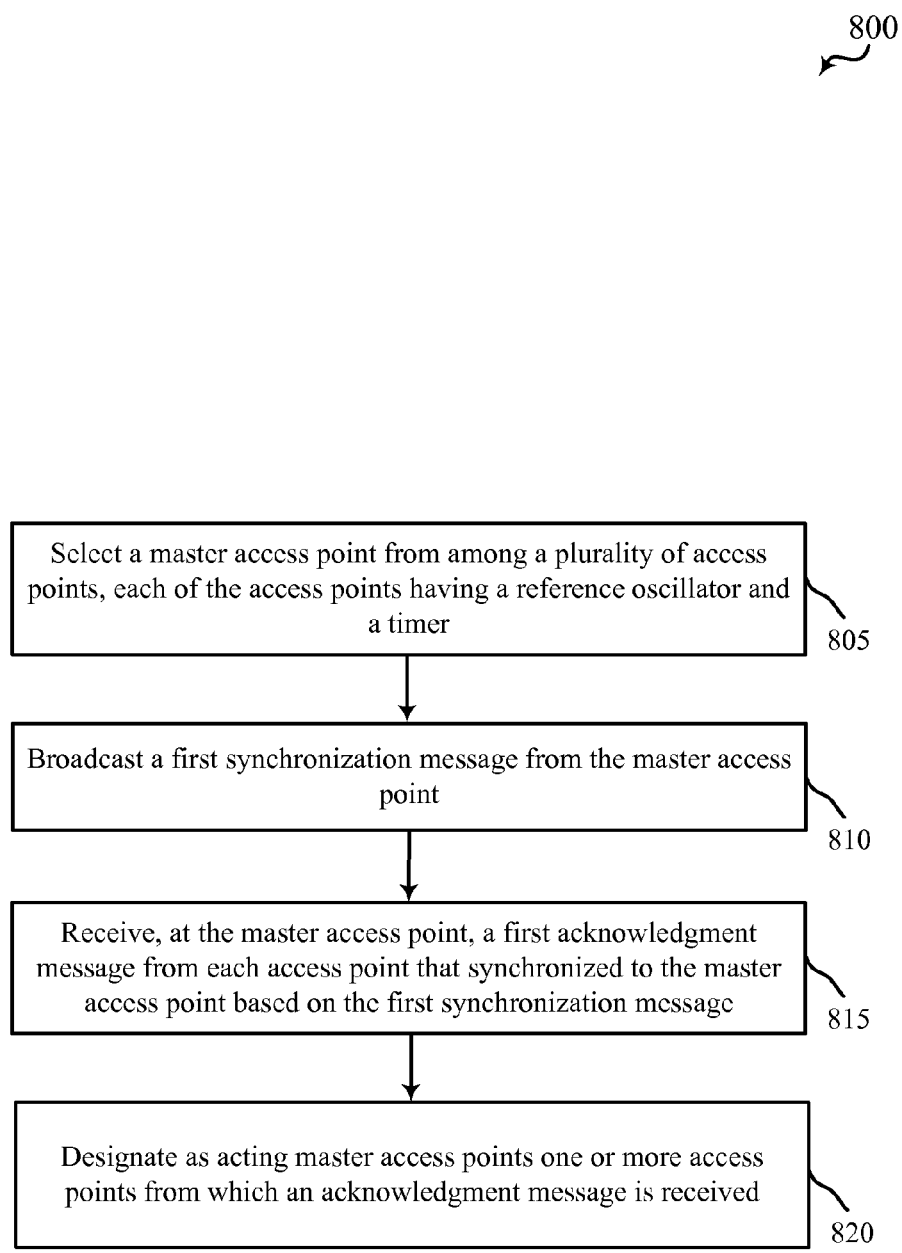
FIGS. 8, 9, and 10 are flow diagrams that depict a method or methods of access point synchronization within a position location network in accordance with various embodiments.

FIG. 8 shows a flow diagram that illustrates a method 800 for synchronizing APs in a position location network within a position location network, according to various embodiments. The method 800 may be implemented using, for example, the devices and systems 100, 200, 200-$a$, 300, 400, 500, 100-$a$, and 700 of FIGS. 1A, 1B, 2A, 2B, 3, 4, 5, 6, and 7.

At block 805, an AP 105, tracking management server 150, and/or some other network component may select a master AP from among a plurality of APs 105, each of the APs 105 having a reference oscillator and a timer. In some embodiments, the operations at block 805 are performed by the management module 550 of FIG. 5.

At block 810, a master AP may broadcast a first synchronization message. For example, the operations at block 810 may be performed by: the device 200 of FIG. 2A; the device 200-$a$ of FIG. 2B; the AP 105-$c$ of FIG. 3; and/or the AP 105-$h$ of FIG. 6.

At block 815, the master AP may receive a first acknowledgment message from each AP 105 that synchronized to the master AP based on the first synchronization message. For example, the operations at block 815 may be performed by:

the device 200 of FIG. 2A; the acknowledgment module 230 of FIG. 2B; the AP 105-c of FIG. 3; and/or the AP 105-h of FIG. 6.

At block 820, the master AP and/or the tracking management server 150, may designate as acting master APs one or more APs 105 from which an acknowledgment message is received. In some cases, the operations at block 820 are performed by: the tracking management server 150 of FIGS. 1A and/or 1B; the acting master designation module 215 of FIG. 2A; the action master designation module 215-a of FIG. 2B; the acting master designation module 215-b of FIG. 3; and/or the management module 550 of FIG. 5.

Figure 9:
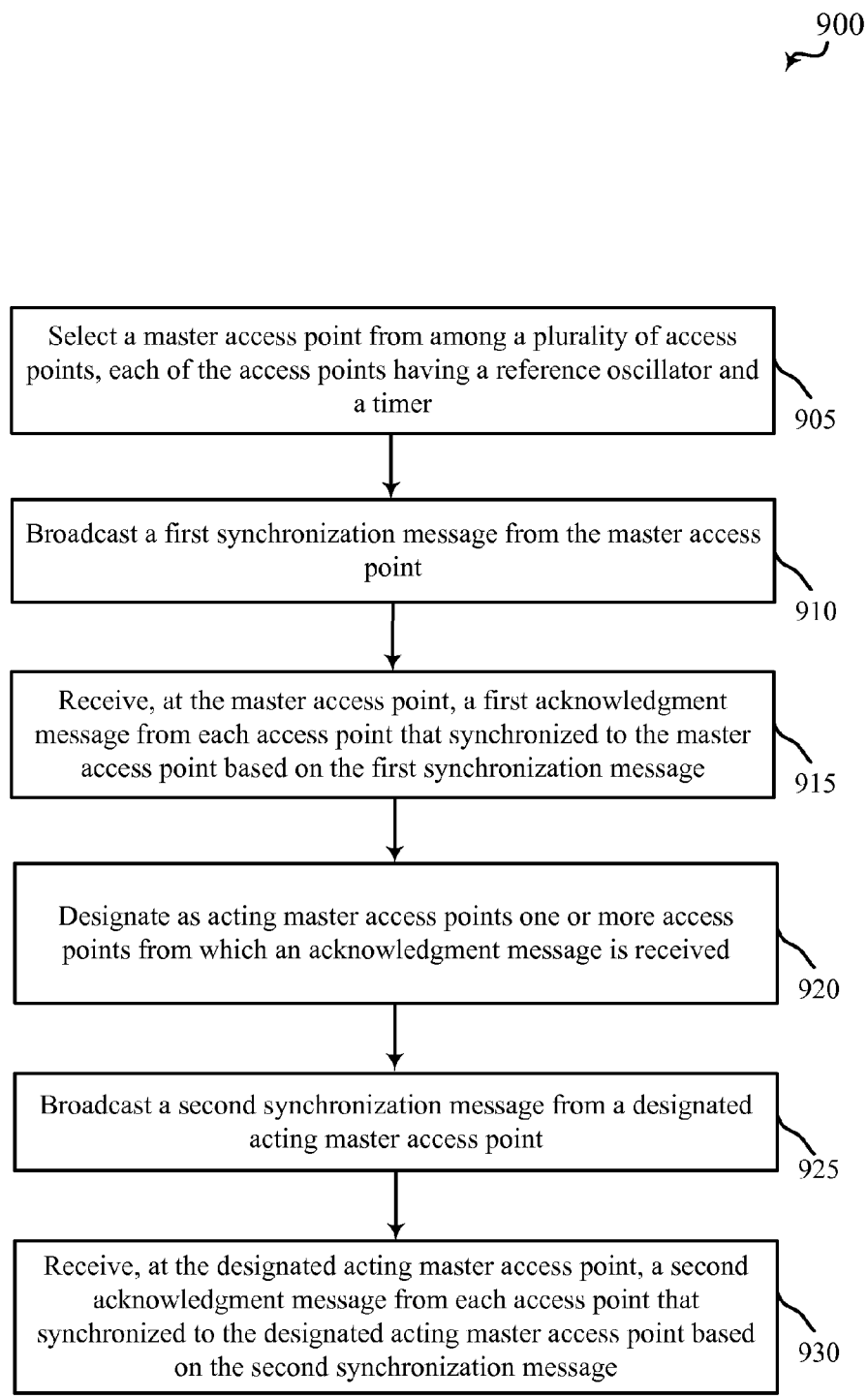

FIG. 9 shows a flow diagram that illustrates a method 900 for synchronizing APs in a position location network within a position location network, according to some embodiments. In some cases, the method 900 may be implemented using some or all of the devices and systems 100, 200, 200-a, 300, 400, 500, 100-a, and 700 of FIGS. 1A, 1B, 2A, 2B, 3, 4, 5, 6, and 7.

At block 905, an AP 105, tracking management server 150, and/or some other network component may select a master AP from among a plurality of APs 105, each of the APs 105 having a reference oscillator and a timer. In some embodiments, the operations at block 905 are performed by the management module 550 of FIG. 5.

At block 910, a master AP may broadcast a first synchronization message. For example, the operations at block 910 may be performed by: the device 200 of FIG. 2A; the device 200-a of FIG. 2B; the AP 105-c of FIG. 3; and/or the AP 105-h of FIG. 6.

At block 915, the master AP may receive a first acknowledgment message from each AP 105 that synchronized to the master AP based on the first synchronization message. For example, the operations at block 915 may be performed by: the device 200 of FIG. 2A; the acknowledgment module 230 of FIG. 2B; the AP 105-c of FIG. 3; and/or the AP 105-h of FIG. 6.

At block 920, the master AP and/or the tracking management server 150, may designate as acting master APs one or more APs 105 from which an acknowledgment message is received. In some cases, the operations at block 920 are performed by: the tracking management server 150 of FIGS. 1A and/or 1B; the acting master designation module 215 of FIG. 2A; the action master designation module 215-a of FIG. 2B; the acting master designation module 215-b of FIG. 3; and/or the management module 550 of FIG. 5.

At block 925, a designated acting master AP may broadcast a second synchronization message. For example, the operations at block 925 may be performed by the device 200 of FIG. 2A; the device 200-a of FIG. 2B; the AP 105-c of FIG. 3; and/or the AP 105-l of FIG. 6.

At block 930, the designated acting master AP may receive a second acknowledgment message from each AP 105 that synchronized to the designated acting master AP based on the second synchronization message. In some embodiments, the operations at block 930 may be performed by the device 200 of FIG. 2A; the acknowledgment module 230 of FIG. 2B; the AP 105-c of FIG. 3; and/or the AP 105-h of FIG. 6.

Figure 10:
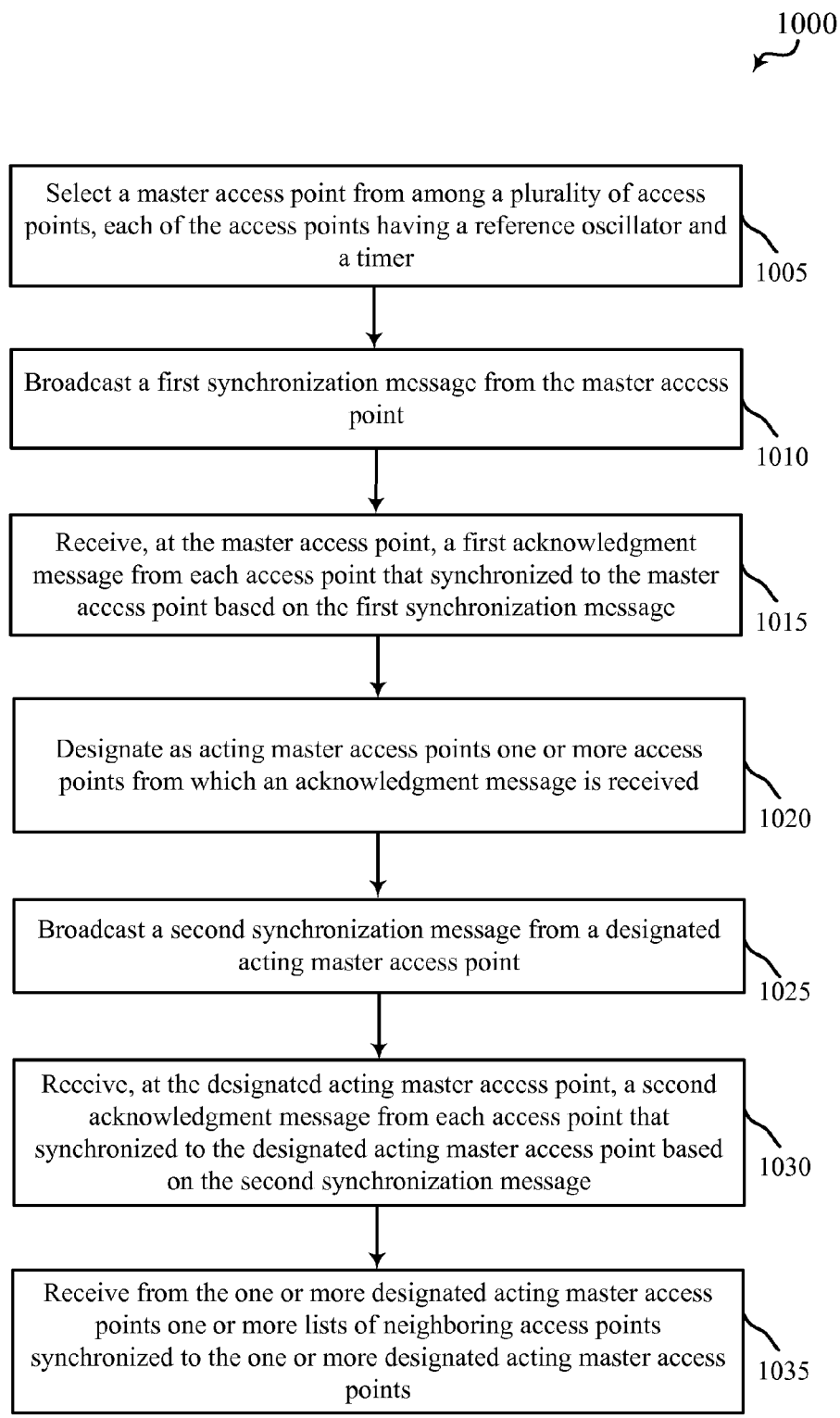

Turning to FIG. 10, which shows a flow diagram that illustrates a method 1000 for synchronizing APs in a position location network within a position location network, according to various embodiments. By way of example, the method 1000 is implemented using some or all of the devices and systems 100, 200, 200-a, 300, 400, 500, 100-a, and 700 of FIGS. 1A, 1B, 2A, 2B, 3, 4, 5, 6, and 7.

At block 1005, an AP 105, tracking management server 150, and/or some other network component may select a master AP from among a plurality of APs 105, each of the APs 105 having a reference oscillator and a timer. In some embodiments, the operations at block 1005 are performed by the management module 550 of FIG. 5.

At block 1010, a master AP may broadcast a first synchronization message. At block 1015, the master AP may receive a first acknowledgment message from each AP 105 that synchronized to the master AP based on the first synchronization message. For example, the operations at block 1010 may be performed by: the device 200 of FIG. 2A; the device 200-a of FIG. 2B; the AP 105-c of FIG. 3; and/or the AP 105-h of FIG. 6.

At block 1020, the master AP and/or the tracking management server 150, may designate as acting master APs one or more APs 105 from which an acknowledgment message is received. In some cases, the operations at block 1020 are performed by: the tracking management server 150 of FIGS. 1A and/or 1B; the acting master designation module 215 of FIG. 2A; the action master designation module 215-a of FIG. 2B; the acting master designation module 215-b of FIG. 3; and/or the management module 550 of FIG. 5.

At block 1025, a designated acting master AP may broadcast a second synchronization message. For example, the operations at block 1025 may be performed by the device 200 of FIG. 2A; the device 200-a of FIG. 2B; the AP 105-c of FIG. 3; and/or the AP 105-l of FIG. 6.

At block 1030, the designated acting master AP may receive a second acknowledgment message from each AP 105 that synchronized to the designated acting master AP based on the second synchronization message. In some embodiments, the operations at block 1030 may be performed by the device 200 of FIG. 2A; the acknowledgment module 230 of FIG. 2B; the AP 105-c of FIG. 3; and/or the AP 105-h of FIG. 6.

At block 1035, the master AP and/or the tracking management server 150 may receive from the one or more designated acting master APs one or more lists of neighboring APs 105 synchronized to the one or more designated acting master APs. In some cases, the operations at block 1035 are performed by: the tracking management server 150 of FIGS. 1A and/or 1B; the acting master designation module 215 of FIG. 2A; the action master designation module 215-a of FIG. 2B; the acting master designation module 215-b of FIG. 3; and/or the synchronized list module 540 of FIG. 5.

It will be apparent to those skilled in the art that the methods 800, 900, and 1000 are but example implementations of the tools and techniques described herein. The methods 800, 900, and 1000 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of synchronizing a position location network, comprising:
    broadcasting a first synchronization message from a master access point (AP), wherein the first synchronization message comprises an ultra-wideband signal, and wherein the master AP comprises a reference oscillator and a timer;
    receiving, at the master AP, a first acknowledgment message from each AP that synchronized to the master AP based on the first synchronization message;
    designating as acting master APs one or more APs from which an acknowledgment message is received, wherein the one or more designated acting master APs are configured to broadcast a second synchronization message; and
    receiving, at the master AP from the one or more designated acting master APs, one or more lists of neighboring APs synchronized to the one or more designated acting master APs.

2. The method of claim 1, wherein each AP is configured with a narrowband transceiver and an ultra-wideband (UWB) transceiver.

3. The method of claim 1, wherein broadcasting the first synchronization message comprises broadcasting a narrowband signal.

4. The method of claim 1, wherein the first synchronization message comprises information related to an oscillator frequency and a timer count.

5. The method of claim 1, wherein the APs that synchronized to the master AP each comprise an AP that estimated a frequency offset and a time offset with respect to the master AP.

6. The method of claim 1, further comprising:
    transmitting, from the master AP to a tracking management server, the one or more lists of neighboring APs synchronized to the one or more designated acting master APs.

7. The method of claim 1, wherein the APs that synchronized to the master AP each comprise an AP that adjusted an oscillator frequency and a timer count based on the first synchronization message.

8. The method of claim 1, further comprising:
    broadcasting a second synchronization message from the one or more designated acting master APs; and
    receiving, at the one or more designated acting master APs, a second acknowledgment message from one or more neighboring APs that synchronized to the one or more designated acting master APs based on the second synchronization message.

9. The method of claim 8, wherein broadcasting the second synchronization message comprises broadcasting at least one of a narrowband signal or a UWB signal.

10. The method of claim 8, wherein the second synchronization message comprises information related to an oscillator frequency and a timer count.

11. A system of synchronizing a position location network, comprising:
    means for broadcasting a first synchronization message from a master access point (AP), wherein the first synchronization message comprises an ultra-wideband signal, and wherein the master AP comprises a reference oscillator and a timer;

means for receiving, at the master AP, a first acknowledgment message from each AP that synchronized to the master AP based on the first synchronization message;

means for designating as acting master APs one or more APs from which an acknowledgment message is received, wherein the one or more designated acting master APs are configured to broadcast a second synchronization message; and means for receiving, at the master AP from the one or more designated acting master APs, one or more lists of neighboring APs synchronized to the one or more designated acting master APs.

12. The system of claim 11, further comprising:

means for broadcasting a second synchronization message from the one or more designated acting master APs; and means for receiving, at the one or more designated acting master APs, a second acknowledgment message from one or more neighboring APs that synchronized to the one or more designated acting master APs based on the second synchronization message.

13. The system of claim 12, wherein broadcasting the second synchronization message comprises broadcasting at least one of a narrowband signal or an UWB signal.

14. The system of claim 12, wherein the second synchronization message comprises information related to an oscillator frequency and a timer count.

15. The system of claim 11, wherein each AP is configured with a narrowband transceiver and an ultra-wideband (UWB) transceiver.

16. The system of claim 11, wherein broadcasting the first synchronization message comprises broadcasting a narrowband signal.

17. The system of claim 11, wherein the first synchronization message comprises information related to an oscillator frequency and a timer count.

18. The system of claim 11, wherein the APs that synchronized to the master AP each comprise an AP that estimated a frequency offset and a time offset with respect to the master AP.

19. The system of claim 11, further comprising:

means for transmitting from the master AP to a tracking management server, the one or more lists of neighboring APs synchronized to the one or more designated acting master APs.

20. The system of claim 11, wherein the APs that synchronized to the master AP each comprise an AP that adjusted an oscillator frequency and a timer count based on the first synchronization message.

21. A computer-program product for synchronizing a position location network, the computer-program product comprising a non-transitory computer-readable medium storing instructions executable by a processor to:

broadcast a first synchronization message from a master access point (AP), wherein the first synchronization message comprises an ultra-wideband signal, and wherein the master AP comprises a reference oscillator and a timer;

receive, at the master AP, a first acknowledgment message from each AP that synchronized to the master AP based on the first synchronization message;

designate as acting master APs one or more APs from which an acknowledgment message is received, wherein the one or more designated acting master APs are configured to broadcast a second synchronization message; and receive, at the master AP from the one or more designated acting master APs, one or more lists of neighboring APs synchronized to the one or more designated acting master APs.

22. The computer-program product of claim 21, wherein the instructions executable by the processor to broadcast the first synchronization message comprise instructions executable by the processor to broadcast a narrowband signal.

23. The computer-program product of claim 21, wherein the first synchronization message comprises information related to an oscillator frequency and a timer count.

24. The computer-program product of claim 21, wherein the APs that synchronized to the master AP each comprise an AP that estimated a frequency offset and a time offset with respect to the master AP.

25. The computer-program product of claim 21, wherein the APs that synchronized to the master AP each comprise an AP that adjusted an oscillator frequency and a timer count based on the first synchronization message.

26. The computer-program product of claim 21, wherein the instructions are further executable by the processor to:

broadcast a second synchronization message from the one or more designated acting master APs; and receive, at the one or more designated acting master APs, a second acknowledgment message from one or more neighboring APs that synchronized to the one or more designated acting master APs based on the second synchronization message.

27. The computer-program product of claim 26, wherein the instructions executable by the processor to broadcast the second message comprise instructions executable by the processor to broadcast at least one of a narrowband or a UWB signal.

28. The computer-program product of claim 26, wherein the second synchronization message comprises information related to an oscillator frequency and a timer count.

29. The computer-program product of claim 21 wherein the instructions are further executable by the processor to:

transmit, from the master AP to a tracking management server, the one or more lists of neighboring APs synchronized to the one or more designated acting master APs.

30. An apparatus for synchronizing a position location network, comprising:

a processor;

memory in electronic communication with the processor; and instructions stored in the memory, the instructions being executable by the processor to:

broadcast a first synchronization message from a master access point (AP), wherein the first synchronization message comprises an ultra-wideband signal, and wherein the master AP comprises a reference oscillator and a timer;

receive, at the master AP, a first acknowledgment message from each AP that synchronized to the master AP based on the first synchronization message;

designate as acting master APs one or more APs from which an acknowledgment message is received, wherein the one or more designated acting master APs are configured to broadcast a second synchronization message; and receive, at the master AP from the one or more designated acting master APs, one or more lists of neighboring APs synchronized to the one or more designated acting master APs.

31. The apparatus of claim 30, wherein the instructions executable by the processor to broadcast the first synchronization message comprise instructions executable by the processor to broadcast a narrowband signal.

32. The apparatus of claim 30, wherein the APs that synchronized to the master AP each comprise an AP that adjusted an oscillator frequency and a timer count based on the first synchronization message.

33. The apparatus of claim 30, wherein the instructions are further executable by the processor to:
  broadcast a second synchronization message from the one or more designated acting master APs; and
  receive, at the one or more designated acting master APs, a second acknowledgment message from one or more neighboring APs that synchronized to the one or more designated acting master APs based on the second synchronization message.

34. The apparatus of claim 33, wherein the instructions executable by the processor to broadcast the second message comprise instructions executable by the processor to broadcast at least one of a narrowband or a UWB signal.

35. The apparatus of claim 33, wherein the second synchronization message comprises information related to an oscillator frequency and a timer count.

36. The apparatus of claim 30, wherein the first synchronization message comprises information related to an oscillator frequency and a timer count.

37. The apparatus of claim 30, wherein the APs that synchronized to the master AP each comprise an AP that estimated a frequency offset and a time offset with respect to the master AP.

38. The apparatus of claim 30, wherein the instructions are further executable by the processor to:
  transmit, from the master AP to a tracking management server, the one or more lists of neighboring APs synchronized to the one or more designated acting master APs.

* * * * *